May 15, 1934.   E. A. KERSTEIN   1,958,704
FLUID METER
Filed Oct. 18, 1929
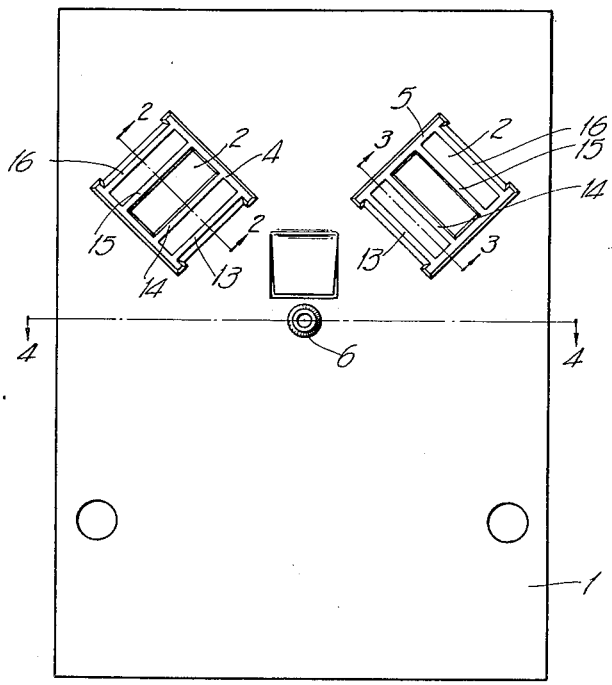
Fig. 1
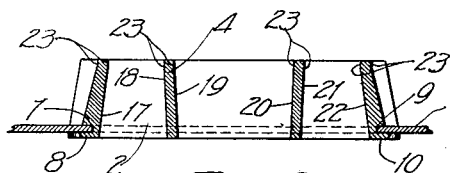
Fig. 2
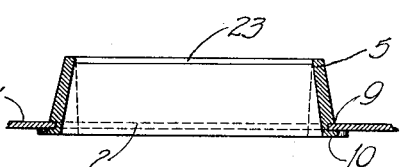
Fig. 3
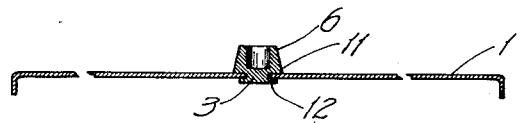
Fig. 4
INVENTOR
Ernest A. Kerstein
ATTORNEY Patented May 15, 1934

1,958,704

UNITED STATES PATENT OFFICE 1,958,704

FLUID METER

Ernest A. Kerstein, Albany, N. Y., assignor to American Meter Company, Inc., New York, N. Y., a corporation of Delaware Application October 18, 1929, Serial No. 400,650

7 Claims. (Cl. 22—203)

My invention relates to fluid meters, and particularly to improvements in the so-called valve plate forming an essential element in gas meters of the diaphragm type.

The valve plate assembly, as is well understood by those familiar with the art, consists of a tinned iron plate embodying two cast metal valve seats and a cast metal crank step or bearing. In fabricating this element or assembly of elements it is the usual practice to die-form the plate from tinned iron with the necessary gas passages therein and an opening for locating the crank step, and thereafter to solder the valve seats and crank step to this plate by hand. The valve seats and the step are cast from "white" metal or babbitt, and are provided on the bottom or lower side with reduced portions adapted to be inserted in the openings in the valve plate so that they are located in approximately the correct position for soldering from the under side. This operation has always presented considerable difficulty from the standpoint of mass production because it is impossible to have the relative positions of the valve seats and the step absolutely standardized and fixed, and furthermore, because it is impossible to positively obtain a gas-tight connection between the valve seats, the step and the plate. In many instances leaks at these places will develop after the entire meter is assembled and considerable time and expense is involved in disassembling the meter to make the necessary repairs. Moreover, because there is a slight variation in the relative positions of the valve seats and step of each assembly as compared with every other assembly the valve cover arms must be made adjustable, and after the meter has been assembled the valve movements must be synchronized by properly adjusting the length of these arms. All of these operations require expert labor, consume considerable time and militate against quantity production.

With a view of overcoming these disadvantages which are inherent to valve plate assemblies of the present type, I have devised a new type of plate assembly and a new method of fabricating the same whereby the relative positions of the valve seats and crank step are positively standardized and whereby a positive non-leaking joint is formed between these elements and the plate itself. In addition to the foregoing I have devised a new type of valve seat whereby the effect of wear in changing the cut off points of the valves has been eliminated.

In the drawing—

Fig. 1 is a top view of my valve plate assembly;

Fig. 2 is a section in the plane 2—2 of Fig. 1;

Fig. 3 is a section in the plane 3—3 of Fig. 1; and

Fig. 4 is a section in the plane 4—4.

Referring to the drawing, 1 represents the usual type of tinned iron valve plate provided with valve openings, 2, and an opening, 3, adapted to receive the crank step. 4 and 5 are the valve seats, and 6 is the step, all made of white metal.

As pointed out above, the practice, heretofore, has been to precast the elements from babbitt or other white metal, insert them in the openings in the plate, and solder them in place from the bottom. My invention contemplates that the valve seats and step will be cast and attached to the plate in one operation.

In order that the relative positions of the seats and step may be the same in every assembly it is essential that the molds for these separate elements be secured together in positively fixed relation, preferably by embodying them in a single unit. While it would be possible to cast the seats and step on one side of the plate, I prefer to cast them around or about the edges of the openings, as shown at 7 and 8, 9 and 10, and 11 and 12, respectively. Because of the fact that the plate, 1, is tinned and because of the character of the metal used in the seats and step, the white metal and tin fuse together forming a positive, gas-tight joint.

In order that the mold may be separated from the casting after the metal is hardened it is of course necessary to so shape the exterior surfaces of the castings that the mold may be freely drawn therefrom. This requires that the surfaces, 17, 18, 19, 20, 21 and 22, be inclined to the vertical or provided with a batter sufficient to provide for the draw. Since the upper surface of the valve seat is normally horizontal and the edges, 13, 14, 15 and 16, form the lines or points of cut off for the valve, it will be evident that any wear upon the valve seat will change the point of cut off if the surfaces, 17, 18, 19, 20, 21 and 22, are sloped or battered for the entire distance from the bottom to top of the seat. To eliminate the effect of wear in this respect I propose to form those portions, 23, of the surfaces, 17, 18, 19, 20, 21 and 22, which are adjacent the top of the valve seat at right angles to the top for a distance of say $\frac{1}{32}$ of an inch, while inclining the major portions thereof to the valve plate. This does not interfere with the drawing of the mold and prevents any change in valve cut off occurring by reason of seat wear during the life of the meter.

While I have described my invention in its preferred embodiment it is to be understood that the words which I have used are words of description and not of limitation, and that changes, within the purview of the appended claims may be made without departing from the true scope and spirit of my invention.

What I claim is—

1. In a fluid meter of the character described, a metal valve plate having a valve seat thereon comprising an integral body of metal embracing both sides of said plate and forming a fluid-tight union therewith.

2. In a fluid meter of the character described, a metal valve plate having a valve seat thereon comprising an integral body of metal merged with surface portions of said plate on both sides thereof and forming a fluid tight union therewith.

3. In a fluid meter of the character described, a metal valve plate having a crank step thereon of different metal from that of said plate but comprising an integral body merged with the surface portions of said plate on both sides thereof and forming a fluid-tight union therewith.

4. In a fluid meter of the character described, a metal valve plate having valve seats and a crank step thereon comprising integral bodies of cast metal of different character from that of said plate but merged with the surface portions of said plate on both sides thereof, and disposed in exact, predetermined, relative positions.

5. The method of forming a metal valve plate, valve seat and crank step assembly for a fluid meter of the character described which comprises forming the plate with openings therein adapted to receive said valve seats and step, respectively, then merging the metal of the valve seats and step with the surface portions of the plate on both sides thereof by casting said elements about the edges of the respective openings, and during the merging operation, maintaining the valve seats and step in precise, predetermined relative position.

6. The method of forming a valve plate, valve seat and crank step assembly for a fluid meter of the character described which comprises forming the plate with openings therein for the valve seats and crank step, respectively, then simultaneously forming the valve seats and crank step and uniting to the plate by casting them about the edges of said openings, and during said forming and uniting operation, maintaining said valve seats and step in precise, predetermined relative position.

7. In a fluid meter of the character described, a metal valve plate having a step thereon comprising an integral body of metal of different character than that of said plate; the metal of said step embracing both sides of said plate and forming a fluid-tight union therewith.

ERNEST A. KERSTEIN.